Patented Apr. 26, 1932

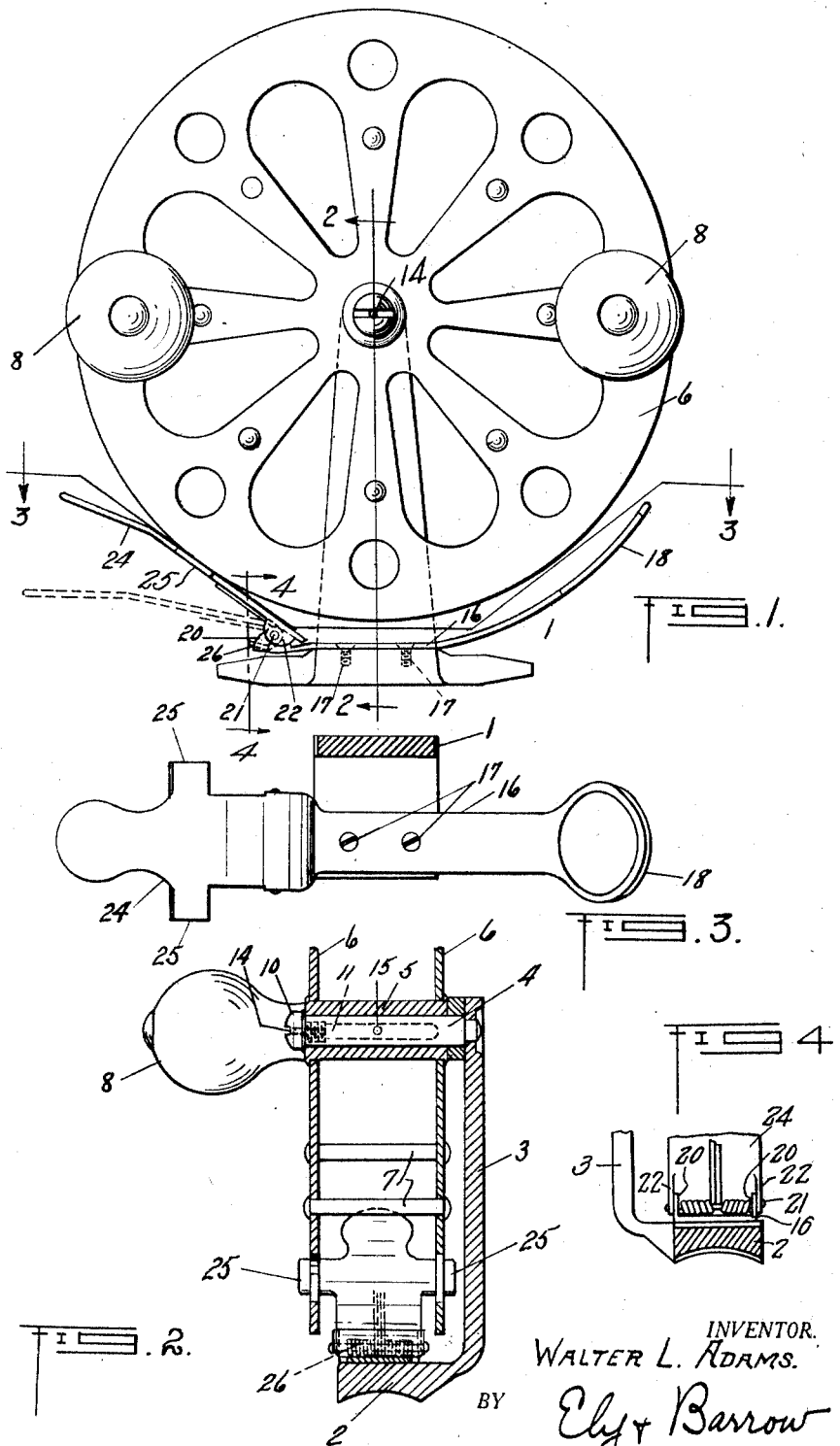

1,856,047

UNITED STATES PATENT OFFICE

WALTER L. ADAMS, OF AKRON, OHIO, ASSIGNOR TO THE ENTERPRISE MANUFACTURING COMPANY, OF AKRON, OHIO, A CORPORATION OF OHIO

FISHING REEL

Application filed February 11, 1928. Serial No. 253,739.

This invention relates to fishing reels, and particularly to the type of fishing reels designated in the art as the single action type in which a large spool is mounted upon a bracket attached to the reel seat, the spool being rotated by means of handles secured to the spool itself.

The present invention has for its object the improvement of this type of reel with respect to the construction of the brake lever and line guide, which is made so that it can be easily reversed for over-rod or under-rod operation. The construction of the bracket and reel seat has also been improved and lubricating means has been provided which will keep the reel well oiled for a long period without attention of the fisherman.

These and other improvements have been made in this type of fishing reel and will be apparent to those skilled in this art, it being understood that the invention is not necessarily limited to the exact details of construction but may be embodied in other forms and designs, within the scope of the claims herein.

In the drawings,

Figure 1 is a side elevation of a fishing reel embodying the improvements;

Figure 2 is a vertical section on the line 2—2 of Figure 1;

Figure 3 is a section on the line 3—3 of Figure 1; and

Figure 4 is a section on line 4—4 of Figure 1.

The reel structure comprises a one-piece reel seat and reel supporting bracket indicated by the numeral 1, the reel seat being shown at 2, and the vertically extending bracket at 3. In the outer end of the bracket is mounted the rigid shaft 4 upon which is rotatably supported the hub 5 of the reel. Mounted in the hub 5 are the outwardly extending metal spool flanges 6, which are cut away as shown for the purpose of lightening the structure. The flanges are spaced apart by transverse tie rods or pins 7 which also serve as the foundation upon which the line is wound. Spool handles 8 are secured to the outer flange by means of which the spool is rotated.

The hub is retained upon the shaft 4 by a bolt 10, and the interior of the shaft is formed with a reservoir 11 for the storage of oil. The reservoir is closed by the bolt 10, and is filled either by removal of the bolt or through an opening 14 in the bolt. A minute opening 15 in the hub allows the oil to pass out into the bearing. In this manner the bearing is kept in a state of constant lubrication.

To the upper surface of the reel seat is secured the combined brake and line guide. This consists of a spring metal plate 16, which is detachably connected to the reel seat by screws 17. One side of the plate 16 extends upwardly in a curve closely paralleling the curvature of the reel head and is provided with an enlarged circular line guiding aperture 18. The opposite side of the plate 16 is formed with two parallel ears or lugs 20, through which passes a pivot pin 21, which may be removable and replaceable in the event of breakage of the spring 26. To the pin 21 are pivoted parallel lugs 22 formed upon a pivoted brake member 24. The member is formed with transverse wings 25 which bear against the reel flanges. The brake lever is forced upwardly against the reel flanges by the coil spring 26, wrapped about the pivot pin and bearing against the lever. To secure the best results and to equalize the pressure upon the flanges, the coil spring is preferably formed as shown with a central loop bearing against the underside of the brake lever, the ends of the spring being coiled about the pin at either side of the loop.

In applying the reel to over-rod or under-rod operation, the combined line guide and brake may be reversed by removal of the screws 17.

What is claimed is:

1. In a fishing reel of the character set forth, a one piece reel seat and reel bracket, the latter being formed midway of the seat at one side thereof and projecting outwardly therefrom, a shaft secured in the outer end of the bracket, a spool on the shaft, and a plate removably attached to the reel seat, said plate having a line guide on one end thereof and a yielding brake lever on the opposite end thereof so that the plate can be turned end for end and the reel used in an inverted position.

2. In a fishing reel of the character set forth, a one piece reel seat and reel bracket, the latter being formed midway of the seat at one side thereof and projecting outwardly therefrom, a shaft secured in the outer end of the bracket, a spool on the shaft, and a combined brake lever and line guide removably secured to the reel seat beneath the spool, the brake lever and line guide being removable as a unit and adapted to be attached to the seat in one position to use the reel in an over-rod position and to the seat in a reversed position to under-rod position.

3. A fishing reel of the character set forth, comprising a reel seat and bracket, a shaft in the outer ends of the bracket projecting over the seat, a spool on the shaft, the flanges of the spool passing closely adjacent the reel seat, a plate secured to the reel seat, said plate having an extension formed with a line guide, a pivoted brake lever on the end of said plate, and a spring forcing the brake lever in contact with the spool flanges.

4. A fishing reel of the character set forth, comprising a reel seat and bracket, a spool journaled on the bracket, a plate secured to the reel seat, said plate having a line guide at one side thereof, a brake adapted to bear against the spool on the opposite side thereof, and means to removably and oppositely secure the plate on the reel seat whereby the reel may be used over or under a fishing rod.

5. A combined line guide and brake lever, comprising a plate having a line guide opening at one end, lugs formed on the plate at the other end thereof, a brake lever pivoted on said lugs, a spring bearing against the lever, and means to secure the plate to a reel seat.

6. A fishing reel of the type described, comprising a reel seat, an integral bracket extending from the reel seat, a spool rotatably mounted on the end of the bracket, and a unitary line guide and spool brake removably and oppositely securable to the reel seat beneath the spool whereby the reel may be used over or under a fishing rod.

7. A combined guide and brake lever comprising a plate, a line guide on the plate, a pin passing through the plate and removable therefrom, a brake lever pivoted on the pin, and spring means bearing against the brake lever and yieldably positioning the same.

WALTER L. ADAMS.